124,358

UNITED STATES PATENT OFFICE.

IRA HOLMES, OF MOSCOW, NEW YORK.

IMPROVEMENT IN COMPOUNDS FOR PRESERVING WOOD.

Specification forming part of Letters Patent No. 124,358, dated March 5, 1872.

SPECIFICATION.

*To whom it may concern:*

Be it known that I, IRA B. HOLMES, of Moscow, in the county of Livingston and State of New York, have invented a new and useful Improvement in Roofing Painting, and Preserving Wood, of which the following is a specification:

The principal feature of my improvement is the preparation of a solution of rosin and asphaltum in naphtha.

In making these preparations I take rosin and pulverize and then sift the same, and then dissolve the powdered rosin in sufficient naphtha without the aid of heat. The asphaltum is also pulverized, sifted, and dissolved in the same manner. These solutions should be kept in stoppered bottles. For roofing, I mix these solutions, or I use equal parts of pulverized rosin and pulverized asphaltum, mixed, and then dissolved in naphtha, as described.

This preparation may be applied to the roof by means of a brush; and, if desired, it may be mixed with sand or other similar material, and used for roofing, for pavements, for cisterns, coffins, and all other similar purposes.

For preserving wood, the pieces may be dipped into the solution of rosin, or into the mixture of the two solutions, above described. For winter use more of the rosin solution may be used to give the mixture sufficient fluidity.

If heat is employed, the naphtha is driven off, and the adhesive properties of the preparation is injured. But after the preparation has been applied, as, for example, to a stove, it soon dries, and then it is not affected by heat until the temperature is excessive.

When applied to a wooden coffin, both the cracks or joints and the pores of the wood are made impenetrable by water, and the coffin is equal to a metallic coffin. The lid of the coffin may be closed by this preparation, and then, if desired, the air may be pumped out, and thus the corpse prevented from the usual decomposition.

I do not claim ejecting the sap from wood by steam, and introducing, by steam or atmospheric pressure, rosin, pitch, or asphalt, held in solution by the use of petroleum, as such is described in Detwiler & Van Gilden's patent of January 17, 1871; but Having described my invention, I claim—

The above-described preparations of rosin and asphaltum, dissolved in naphtha without the aid of heat, for use in roofing, pavements, cisterns, coffins, preserving wood, and other similar purposes, substantially as set forth.

IRA HOLMES.

Witnesses:
EDM. F. BROWN,
DANIEL BREED.